Oct. 21, 1941.   H. V. GARCIA   2,259,939
NUT SHELLING MACHINE
Filed Sept. 9, 1940
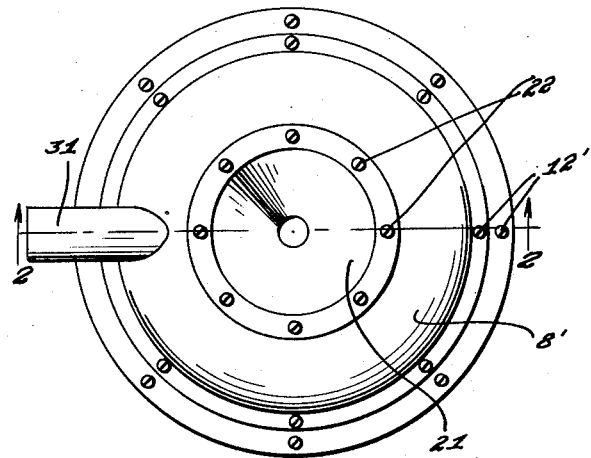
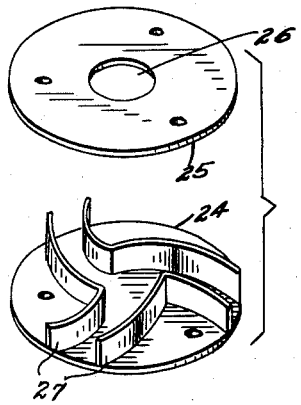
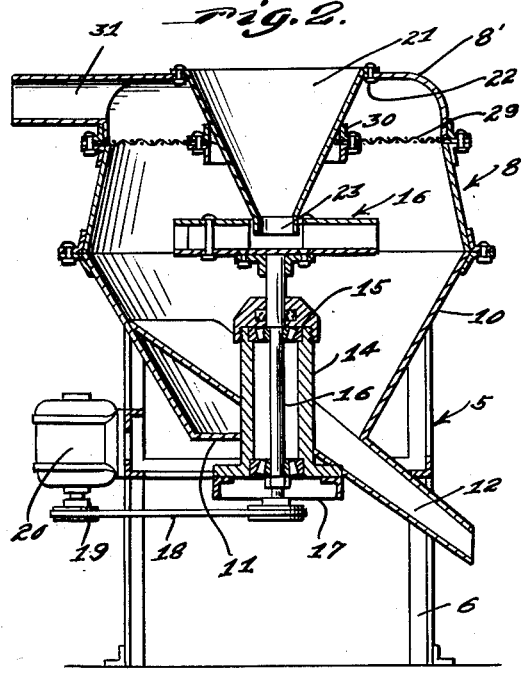
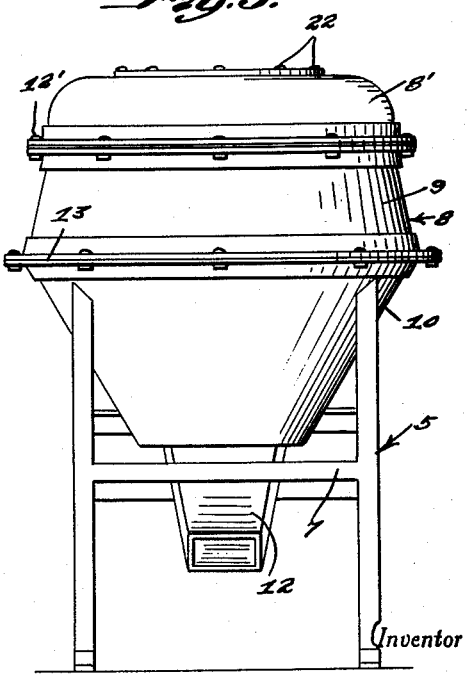
Inventor
Henry V. Garcia
By Clarence A. O'Brien
Attorney Patented Oct. 21, 1941

2,259,939

UNITED STATES PATENT OFFICE 2,259,939

NUT SHELLING MACHINE

Henry V. Garcia, San Antonio, Tex., assignor to Southern Pecan Company, San Antonio, Tex.

Application September 9, 1940, Serial No. 356,052

2 Claims. (Cl. 146—9)

This invention relates to a nut shelling machine, and the primary object of this invention is the provision of a device of this character which will minimize the amount of manual labor necessary in the removing of meat or kernels from the shells of nuts and which will perform the shelling of nuts after they have been cracked with rapidity and efficiency utilizing centrifugal action to throw the cracked nuts against relatively fixed walls of the device so that the meat or kernels will be thoroughly dislodged or separated from the shells permitting a large amount of nuts to be shelled within a comparatively short period of time, and at the same time permit the carrying off of chaff and other small particles without the loss of the meat or kernels of the nuts.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawing, in which Figure 1 is a top plan view illustrating a nut shelling machine constructed in accordance with my invention.

Figure 2 is a vertical sectional view taken on the line 2—2 of Figure 1.

Figure 3 is a side elevation illustrating the device.

Figure 4 is an exploded perspective view illustrating the impeller.

Referring in detail to the drawing, the numeral 5 indicates a supporting structure consisting primarily of vertically arranged legs 6 connected together and strengthened by braces 7.

A container or casing 8 is mounted on the supporting structure by having the upper ends of the legs either fixed thereto or with the casing extending downwardly between the legs with a wedging fit therewith which will permit the container or casing to be readily removed from the supporting structure when desired.

The container or casing includes an upper section 8', an intermediate section 9 and a bottom section 10. The bottom section 10 is of substantially conical shape, the bottom wall of which is indicated by the character 11, and is provided with an opening to permit a chute 12 to extend into the lower section and terminate at its lower end a limited distance beyond the supporting structure so that suitable catch receptacles may be placed thereunder. Also, it is to be noted that the chute 12 widens toward its upper end.

The section 9 of the casing converges toward its upper end while the upper section 8' is of substantially dome shape. The sections 8, 9 and 10 are detachably connected by bolts or similar fasteners 12' extending through aligned apertures of flanges 13 formed on the meeting edges of the sections.

Extending upwardly through the bottom wall 11 of the lower section 10 is a tubular housing 14 carrying bearings 15 for rotatably supporting a shaft 16, the upper end of which terminates substantially flush with the upper edge of the section 10 of the casing and has secured thereto an impeller 16. The lower end of the shaft extends outwardly of the lower end of the housing and has secured thereto a belt pulley 17 and trained thereover is an endless belt 18 which also is trained over a pulley 19 connected to an electric motor 20 mounted on the supporting structure 5. By employing different size pulleys and belts the speed at which the impeller is driven by the electric motor may be varied and which is necessary when shelling different kinds of nuts.

The upper section 8' is provided with a centrally arranged opening through which extends a substantially funnel-shaped hopper 21, the latter being bolted or otherwise secured to the upper section 8', as shown at 22. The lower end of the hopper 21 terminates in a discharge neck 23 and within the impeller 16 and axially of the latter.

The impeller includes the superposed plates 24 and 25, the plate 25 being provided with an opening 26 centrally thereof to receive the neck 23 of the hopper 21. Fixed on the plate 24 and engaged by the plate 25 are arcuately curved vanes 27 grouped so as to extend substantially radially from the center of the plates. The plates 24 and 25 are suitably secured together and may be detached from one another when it is desired to clean the interior of the impeller or the passages defined by the vanes 27. By referring to Figure 2 it will be seen that the nuts are delivered into the impeller axially thereof and with the impeller in rotation the nuts will be thrown therefrom by way of the passages defined by the vanes against the walls of the casing or container with considerable force to bring about dislodgment of the meat or kernels of the nuts from the shells.

It is to be understood that the nuts are cracked prior to being placed in the hopper 21. As the nuts strike against the walls of the casing they gravitate and are caught in the chute 12 and discharged exteriorly into suitable containers provided therefor.

A screen 29 is mounted between the sections 8' and 9 of the casing and is provided with a collar 30 which encircles and engages the hopper 21. The section 8' of the casing above the screen is provided with an outlet pipe 31. The rotation of the impeller creates a circulation of air in the casing and this air passes upwardly through the screen and outwardly by way of the outlet pipe 31, carrying therewith chaff and other small particles of foreign matter, the screen 29 acting to prevent any meat or kernels of the nuts from passing out of the casing by way of the discharge pipe 31.

From the foregoing description taken in connection with the accompanying drawing, it will be seen that I have provided a very efficient, practical and inexpensive machine which will thoroughly separate or dislodge the meat or kernels of nuts from the shells by employing centrifugal action. The impeller developing said centrifugal action also acts to circulate air for carrying off chaff and other matter from the nuts so that the nuts after being acted upon may be discharged by a common outlet with the meat or kernels completely dislodged from the shells, consequently permitting the shelling of nuts to be carried out rapidly and in large quantities within a comparatively short period of time which reduces to a minimum the expense of marketing nut meat or kernels and the amount of manual labor necessary in carrying out the shelling operation.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a shelling machine of the character described, a supporting structure, a casing carried by said supporting structure and including upper, intermediate and lower sections detachably connected, with the lower section of substantially conical shape and the intermediate section converging toward its upper end and the upper section of substantially dome shape and provided with a centrally arranged opening, a hopper extending through the opening and supported by the upper section, a shaft journaled in said casing, an impeller secured to said shaft and receiving axially thereof nuts from the hopper and discharging said nuts by centrifugal force against the walls of the intermediate and lower sections of the casing to bring about dislodgment of the kernels or meat of the nuts from the shells, a chute extending from the lower section, means for rotating the shaft, a screen supported in the casing by being disposed between the upper and intermediate sections and having a centrally arranged collar to engage and permit the hopper to extend through the screen to the impeller, and an air outlet pipe connected with the upper section.

2. In a nut shelling machine, a vertically arranged casing composed of upper and lower substantially frusto-conical parts connected together at their large ends, and a top member connected with the upper end of the upper member and having a hole in its top and a discharge opening in a side portion thereof, a funnel-shaped hopper passing through the hole and connected with the top member and the lower end of the hopper being located slightly above the point of connection of the two substantialy frusto-conical members, an impeller rotatably arranged in the casing and having a centrally arranged hole in its top part for receiving the lower end of the hopper, the impeller discharging the articles received from the hopper against the internal walls of the casing at approximately the point where the two frusto-conical members are joined together, means for rotating the impeller, a discharge chute extending downwardly and outwardly from the lower part of the casing and a screen extending across the top of the casing at substantially the point where the top member joins the upper frusto-conical member.

HENRY V. GARCIA.

CERTIFICATE OF CORRECTION.

Patent No. 2,259,939. October 21, 1941.

HENRY V. GARCIA.

It is hereby certified that the name of the assignee in the above numbered patent was erroneously described and specified as "Southern Pecan Company" whereas said name should have been described and specified as --Southern Pecan Shelling Company--, as shown by the record of assignments in this office; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.